(12) United States Patent
Hawker et al.

(10) Patent No.: US 7,555,118 B2
(45) Date of Patent: Jun. 30, 2009

(54) MICROPHONE COUPLER FOR A COMMUNICATION DEVICE

(75) Inventors: Larry Hawker, Waterloo (CA); George Mankaruse, Kitchener (CA); James Infanti, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 616 days.

(21) Appl. No.: 11/258,192

(22) Filed: Oct. 26, 2005

(65) Prior Publication Data

US 2007/0116261 A1  May 24, 2007

(51) Int. Cl.
*H04M 1/00* (2006.01)
*H04M 9/00* (2006.01)
*H04R 11/04* (2006.01)
*H04R 17/02* (2006.01)
*H04R 19/04* (2006.01)

(52) U.S. Cl. .................. 379/419; 379/433.03; 381/355; 381/361

(58) Field of Classification Search .................. 379/419, 379/433.03; 381/360, 369, 361, 355, 356, 381/359; 181/171, 158, 166; 455/575.1
See application file for complete search history.

(56) References Cited

U.S. PATENT DOCUMENTS 5,491,478 A * 2/1996 de la Luz et al. .............. 341/22
6,091,830 A    7/2000 Toki

FOREIGN PATENT DOCUMENTS

| EP | 0 661 902 A1 | 7/1995 |
| EP | 0 707 403 A2 | 4/1996 |
| JP | 07202997     | 8/1995 |

* cited by examiner

*Primary Examiner*—Tuan D Nguyen
(74) *Attorney, Agent, or Firm*—McCarthy Tétrault LLP

(57) ABSTRACT

The invention provides a communication device and a microphone coupler. The device comprises: a microphone; a printed circuit board (PCB) to connect to the microphone; a boot assembly to enclose the microphone and to direct acoustic signals to the microphone; a platform; a housing to enclose the PCB, the microphone, the platform and the boot assembly and to provide an opening to access the microphone; and an acoustic channel connecting the microphone to the opening in the housing. In the device, part of the acoustic channel is formed by a channel formed when the above noted components are assembled together.

18 Claims, 8 Drawing Sheets

ововInterferingMICROPHONE COUPLER FOR A COMMUNICATION DEVICE

FIELD OF INVENTION

The invention relates to a microphone coupler for a communication device. In particular, the invention provides a microphone coupler providing a conduit allowing a microphone for the device to be placed in different locations while maintaining acceptable levels of acoustic performance for the microphone.

BACKGROUND

Many types of electronic communication devices provide voice communication capabilities, such as telephones, cellular telephones and walkie talkies. Generally, such devices have a handset incorporating a microphone and a speaker. The microphone takes the locally generated audible signals (e.g. a user's voice) and the speaker recreates the remotely received audible signals (e.g. the other party's voice). Electronic circuits connected to the microphone convert the locally generated audible signals into electronic signals for further processing and transmission by the device. Other electronic circuits provide the electronic signals embodying the received audible signals to the speaker. General performance parameters influence the placement of the microphone and speaker in such devices. For example, the microphone should be sufficiently isolated from interference generated from other components, but it still needs to be able to receive the locally generated audible signals.

In a typical stationary communication device (such as an office telephone) its handset is shaped such that the microphone and speaker are in a spaced relationship to each other. When the handset is properly placed near a user's face, the speaker is located near an ear of the user and the microphone is located near the user's mouth. As portability is not generally the most critical issue for a stationary device, the handset can be made large enough such that the microphone, speaker and other components can be mounted at different areas within the handset and can each operate without unacceptably interfering with each other.

Meanwhile, portable communication devices, such as cellular phones, have smaller form factors. Locating the microphone and speaker in an appropriate spaced relationship within their form factors is more difficult, because of the smaller size of the handsets and the increased density of internal components. Further, their antennae generate interfering signals for some components. As such, suitable locations for the speaker and microphones in the devices become harder to find.

There is a need for an arrangement which addresses such issues in the prior art.

BRIEF DESCRIPTION OF DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF AN EMBODIMENT

Figure 1:
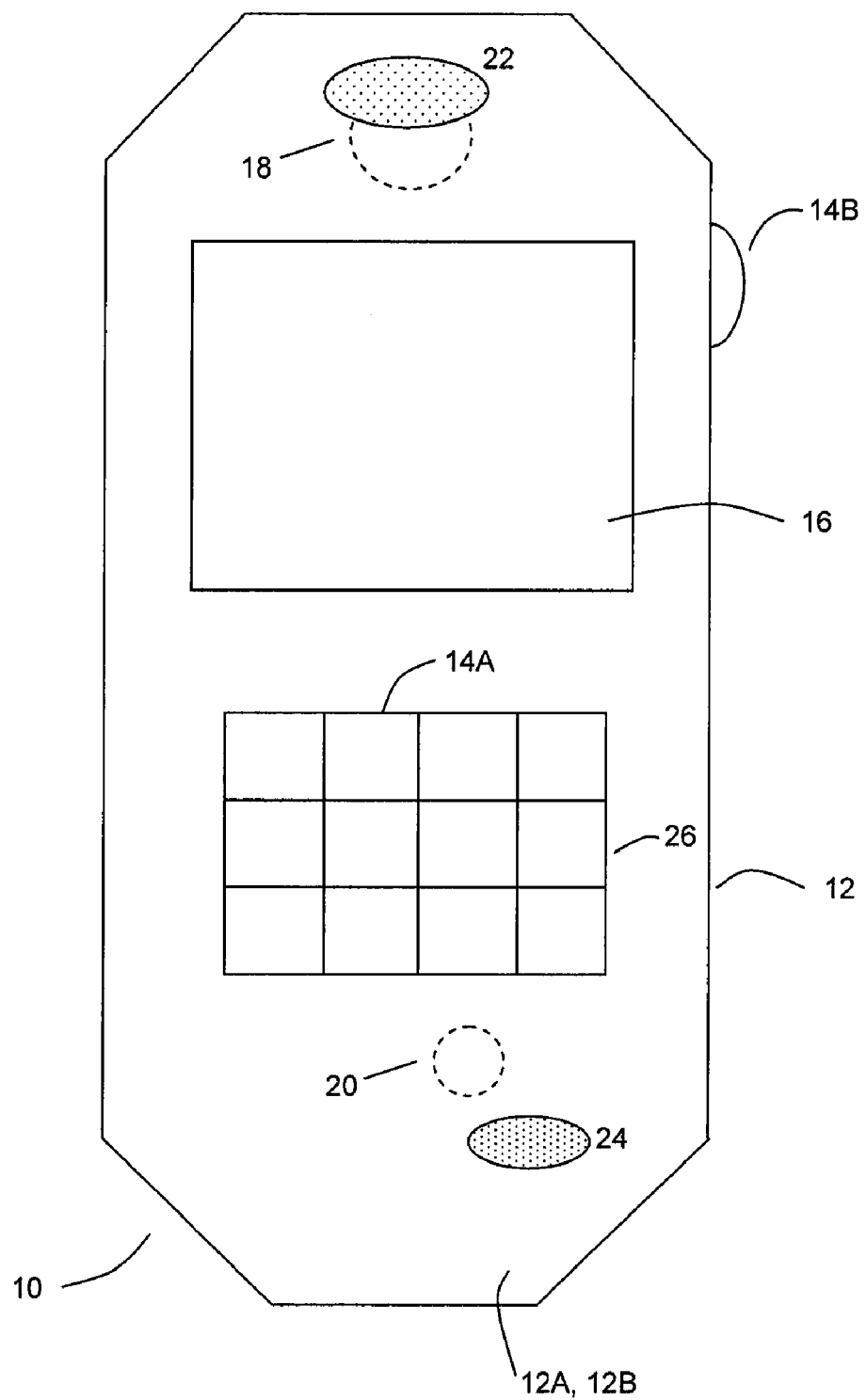
FIG. 1 is a schematic representation of a communication device incorporating an embodiment of the invention.

The description which follows and the embodiments described therein are provided by way of illustration of examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect of an embodiment, a communication device is provided. The device comprises: a microphone; a printed circuit board (PCB) to connect to the microphone; a boot assembly to enclose the microphone and to direct acoustic signals to the microphone; a platform; a housing to enclose the PCB, the microphone, the platform and the boot assembly and to provide an opening to access the microphone; and an acoustic channel connecting the microphone to the opening in the housing. In the device, part of the acoustic channel is formed by a channel formed when the above noted components are assembled together. In particular, that part of the channel is formed when: the boot assembly is mounted over the microphone; the platform is mounted over the boot assembly; and the housing is assembled to enclose the PCB.

In the device, the platform may comprise an aperture therein; part of the acoustic channel may be connected to a bottom side of the aperture; and the acoustic channel also may comprise a gasket having an internal conduit. The gasket may be mounted at one end to a top side of the aperture and at another end to an opening in the housing.

In the device, the platform may further comprises a frame shaped to hold the assembly underneath the frame.

In the device, the opening in the housing may be located in a lower end of the housing.

In the device, the microphone may be mounted on the PCB with its aperture facing upward from the PCB.

In the device, the boot assembly may comprise: a coupling section shaped to hold the microphone with its aperture facing upward from the PCB; a beam extending outwardly from the coupling section; a wall extending above a perimeter of the beam, forming a channel within the wall and above the beam and with an air gap above the aperture of the microphone and the volume.

In the device, the conduit may form a first 90 degree turn from the microphone and a second 90 degree turn to the aperture in the support.

In the device, an acoustic mesh may be provided in the acoustic channel.

In the device, digital signal processing may be provided to adjust signals generated by the microphone to accommodate for acoustic characteristics of the acoustic channel.

In the device, a keypad may be mounted on a top surface of the platform.

In the device, the coupling section may comprise a lateral rib extending around its exterior to mate with an interior surface of the frame of the platform.

In a second aspect, a microphone coupler for a microphone in a communication device is provided. The coupler comprises: a coupling section shaped to hold the microphone with its aperture facing upward from the PCB; a beam extending outwardly from the coupling section; a wall extending above a perimeter of the beam, forming a channel within the wall and above the beam and with an air gap above the aperture of the microphone.

The coupler may be shaped to mate with a platform to hold the coupler underneath the platform and to seal against a bottom side of the platform to seal the conduit.

In the coupler, the conduit may form a first 90 degree turn from the microphone and a second 90 degree turn to the aperture in the platform.

In other aspects various combinations of sets and subsets of the above aspects are provided.

FIG. 1 schematically illustrates a handheld mobile communication device 10 and its components, including a housing 12, input devices (e.g. keyboard 14A or thumbwheel 14B) and display 16, which is preferably a graphic Liquid Crystal Display (LCD), although other types of output devices may alternatively be utilized. Typically, housing 12 is a moulded polycarbonate structure and may be formed via known plastic forming techniques. To assist in assembly of device 10, housing 12 typically comprises two or more pieces which mate together in a fitted arrangement to enclose the internal components and form an exterior casing for device 10. For example, housing 12 may comprise an upper housing (12A) and a lower housing (12B) which fit together. Physically for device 10, housing 12 may be elongated vertically, or may take on other sizes and shapes (including clamshell cover structures). Device 10 has a speaker 18 and microphone 20 (each is shown in dashed outline as each is contained within device 10) which are connected and controlled by electronic circuits (not shown) and software within device 10. These components provide an audible communication interface for voice communications processed by device 10, such as a telephone call. Housing 12A has a series of openings in it providing access to components located inside device 10. Opening 22 is located in an upper region of device 10 and provides a connection to speaker 18, allowing sound generated by speaker 18 to be emitted from within device 10. Opening 24 is located in a lower region in device 10 and provides an access channel for sounds generated by the user to enter device 10 which are subsequently directed towards microphone 20. Opening 26 provides an aperture for keypad 14A to protrude from within device 10 to have its keys extending above the front surface of device 10.

Figure 2:
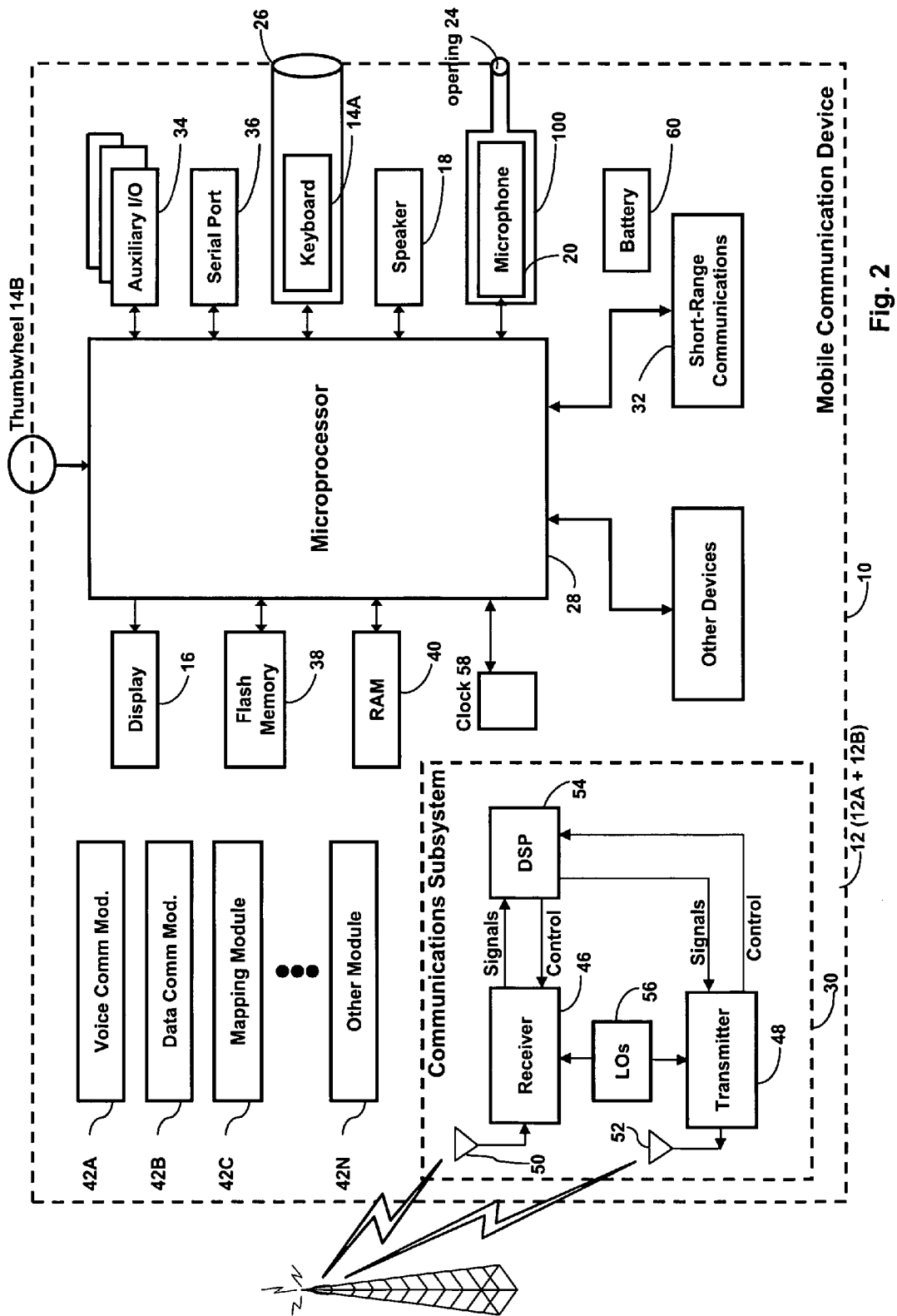
FIG. 2 is a block diagram of internal components of the communication device of FIG. 1, including a microphone and a microphone boot assembly.

Referring to FIG. 2, operating components of device 10 are shown. A central data processing element in device 10 is microprocessor 28, which is shown as being coupled between keyboard 14A, thumbwheel 14B, display 16, speaker 18 and microphone 20 and a series of other internal devices. For the purposes of the description, the term keypad and keyboard refers to both the exterior mechanical exposed key elements and the underlying switch and activation elements (e.g. elastomers, domes and contact regions). Microprocessor 28 controls the operation of the display 16, as well as the overall operation of the device 10, in response to actuation of keys on the keyboard 14A or thumbwheel 14B by a user. Exemplary microprocessors which may be used for microprocessor 28 include Data 950 (trade-mark) series microprocessors and the 6200 series microprocessor, both available from Intel Corporation.

In addition to the microprocessor 28, other internal components of the device 10 are shown. These devices include: a communication subsystem 30, a short-range communication subsystem 32, a set of auxiliary I/O devices 34 and a serial port 36. Memory for device 10 is provided in flash memory 38 and random access memory (RAM) 40. Internal devices are enclosed within housing 12 and typically are either mounted onto a printed circuit board (PCB), affixed to an interior part of the cover or suspended by some means within housing 12.

The device 10 is preferably a two-way radio frequency (RF) communication device having voice and data communication capabilities. In addition, device 10 preferably has the capability to communicate with other computer systems via the Internet.

Operating system software executed by the microprocessor 28 is preferably stored in a computer readable medium, such as flash memory 38, but may be stored in other types of memory devices, such as read only memory (ROM) or similar storage element. In addition, system software, specific device applications, or parts thereof, may be temporarily loaded into a volatile store, such as RAM 40. Communication signals received by the mobile device may also be stored to RAM 40.

Microprocessor 28, in addition to its operating system functions, enables execution of software applications on device 10. A set of software applications that control basic device operations, such as a voice communication module 42A and a data communication module 42B, may be installed on the device 10 during manufacture or downloaded thereafter. Cell mapping module 42C may also be installed on device 10 during manufacture. As well, additional software modules, illustrated as another software module 42D, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. PIM application is also preferably capable of sending and receiving data items via a wireless network 44.

Communication functions, including data and voice communications, are performed through the communication subsystem 30, and possibly through the short-range communication subsystem 32. Communication subsystem 30 includes receiver 46, transmitter 48 and one or more antennae, illustrated as receive antenna 50 and transmit antenna 52 (which are typically combined into a single antenna). In addition, communication subsystem 30 also includes processing module, such as digital signal processor (DSP) 54 and local oscillators (LOs) 56. The specific design and implementation of communication subsystem 30 is dependent upon the communication network in which device 10 is intended to operate. For example, communication subsystem 30 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice networks, both separate and integrated, may also be utilized with device 10. It will be appreciated that some signals received and transmitted through the subsystem 30 may provide interfering signals with other components in device 10, such as microphone 20.

Network access requirements vary depending upon the type of communication system which can communicate with device 10. For example, in the Mobitex (trade-mark) and DataTAC (trade-mark) networks, mobile devices are registered on the network using a unique Personal Identification Number (PIN) associated with each device. In GPRS networks, however, network access is associated with a subscriber or user of a device. A GPRS device therefore requires a subscriber identity module, commonly referred to as a Subscriber Identity Module (SIM) card, in order to operate on a GPRS network.

When required network registration or activation procedures have been completed, device 10 may send and receive communication signals over communication network 44. Signals received from communication network 44 by the receive antenna 50 are routed to receiver 46, which provides for signal amplification, frequency down conversion, filtering, channel selection, etc., and may also provide analog to digital conversion. Analog-to-digital conversion of received signals allows the DSP 54 to perform more complex communication functions, such as signal demodulation and decoding. In a similar manner, signals to be transmitted to network 44 are processed (e.g., modulated and encoded) by DSP 54 and are then provided to transmitter 48 for digital to analog conversion, frequency up conversion, filtering, amplification and transmission to communication network 44 (or networks) via the transmit antenna 52.

In addition to processing communication signals, DSP 54 provides for control of receiver 46 and transmitter 48. For example, gains applied to communication signals in receiver 46 and transmitter 48 may be adaptively controlled through automatic gain control algorithms implemented in DSP 54.

In a data communication mode, a received signal, such as a text message or web page download, is processed by the communication subsystem 30 and is provided to microprocessor 28. The received signal is then further processed by microprocessor 28 for an output to the display 16, or alternatively to some other auxiliary I/O devices 34. A device user may also compose data items, such as e-mail messages, using keypad 14A, thumb-wheel 14B and/or some other auxiliary I/O device 34, such as a touchpad, a rocker switch or some other type of input device. The composed data items may then be transmitted over communication network 44 via communication subsystem 30.

Figure 3:
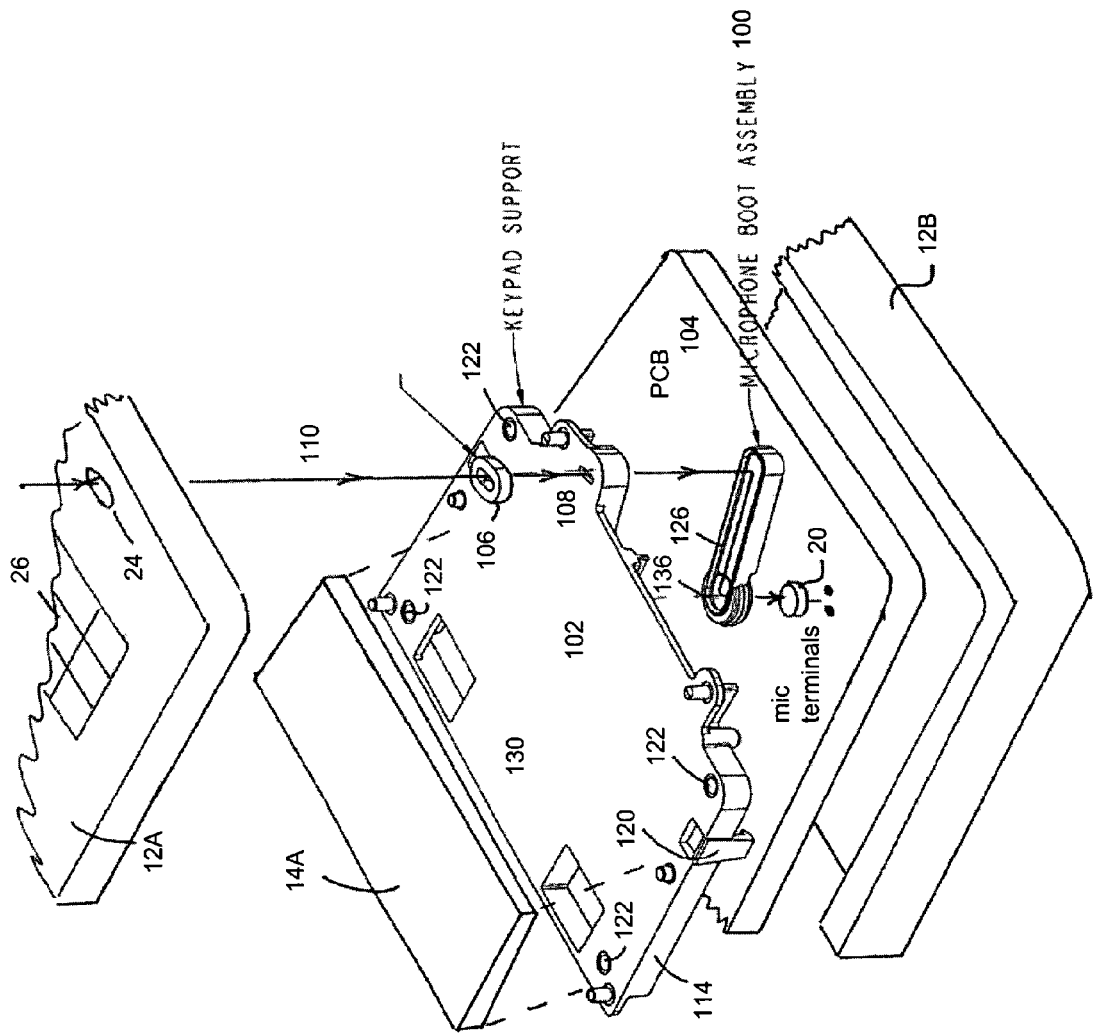
FIG. 3 is a schematic representation of an exploded upper perspective view of components in a bottom section of the device of FIGS. 1 and 2, including a portion of a lower housing, a portion of a printed circuit board (PCB), the microphone, the microphone boot assembly, a keypad support, a keypad, a microphone gasket and a portion of an upper housing.

In a voice communication mode, overall operation of device 10 is substantially similar to the data communication mode, except that received signals are output to speaker 18, and received audio signals are provided to microphone 20 for conversion into an electrical signal and processing by device 10. Microphone 20 is preferably an electret condenser microphone (ECM), but any type of microphone may be used which can be mounted to PCB 104 (shown in FIG. 3), including a silicon-based transducer. Microphone boot assembly 100 is coupled to microphone 20 and provides part of an acoustic channel to direct voice signals received from the outside of device 10 at opening 24 to microphone 20.

Short-range communication subsystem 32 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Clock circuit 58 provides a regular clocking signal for microprocessor 28 and its signal can be used by other components in device 10.

Powering the entire electronics of the mobile handheld communication device is power source 60. Preferably, the power source 60 includes one or more batteries. More preferably, the power source 60 is a single battery pack, especially a rechargeable battery pack. A power switch (not shown) provides a separate on/off switch for device 10.

Figure 4A:
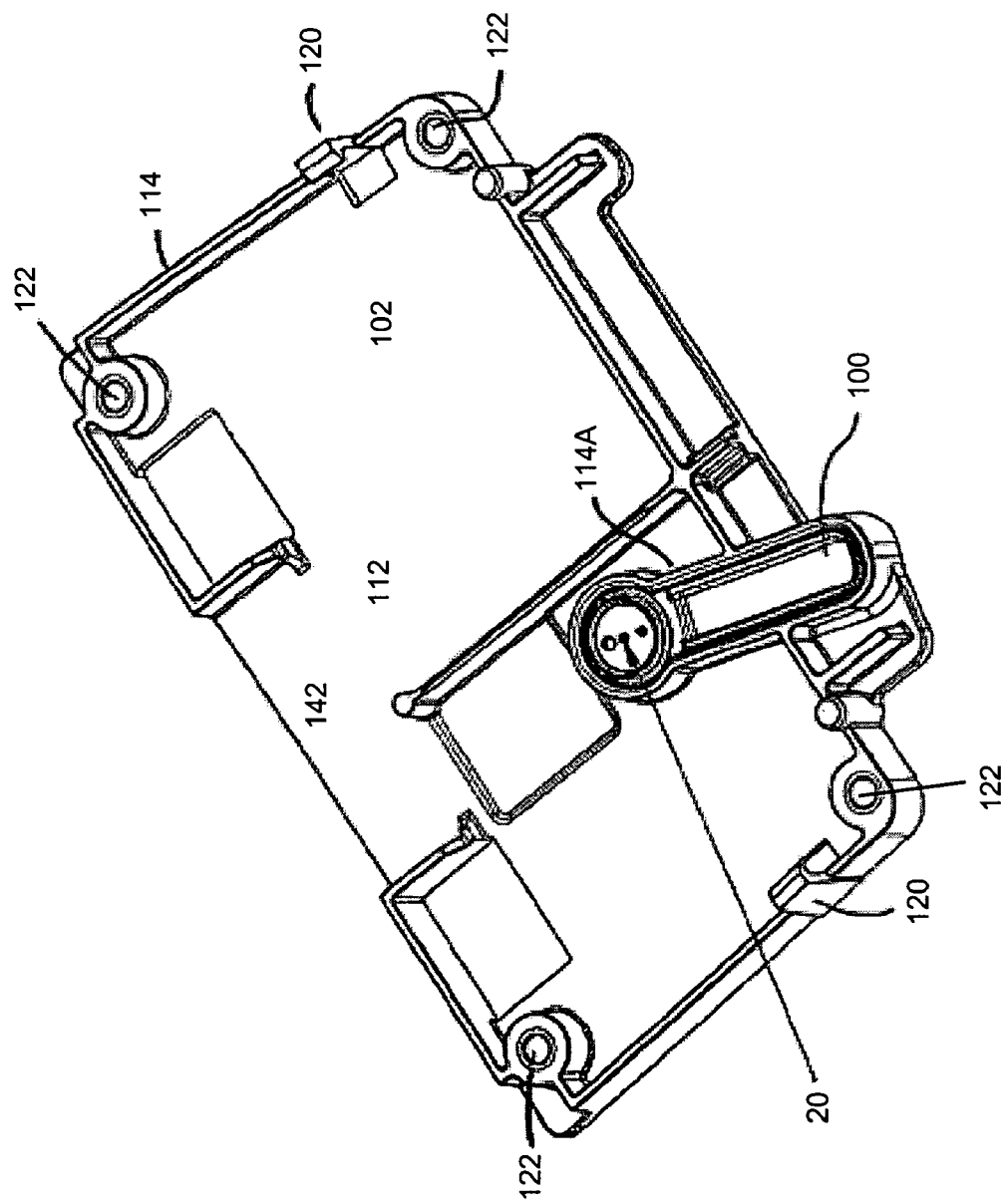
FIG. 4A is a schematic representation of a lower perspective view of the keypad support of FIG. 3 having the microphone boot assembly inserted therein.
Figure 4B:
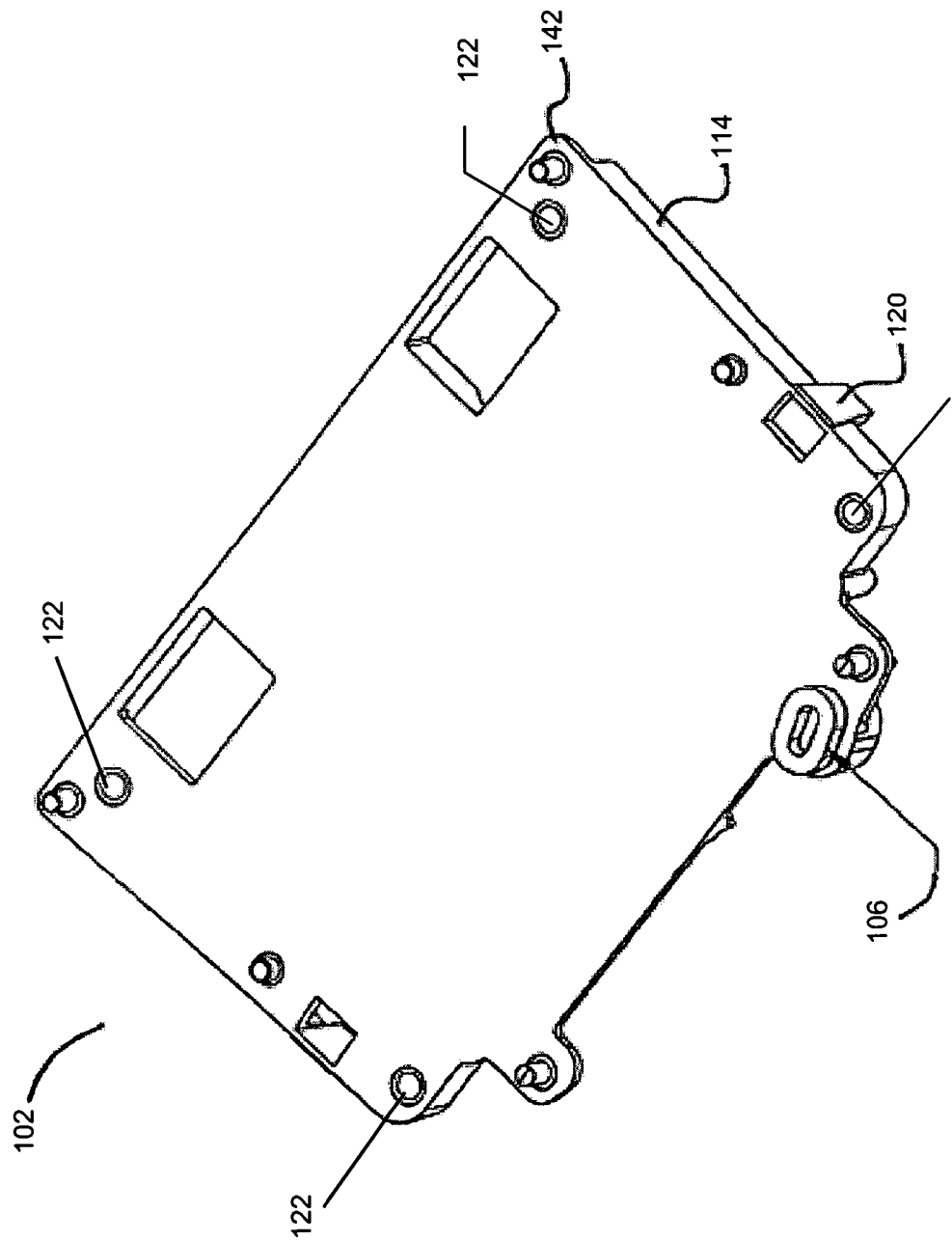
FIG. 4B is a schematic representation of an upper perspective view of the keypad support of FIG. 3 having the microphone gasket mounted in place.
Figure 5:
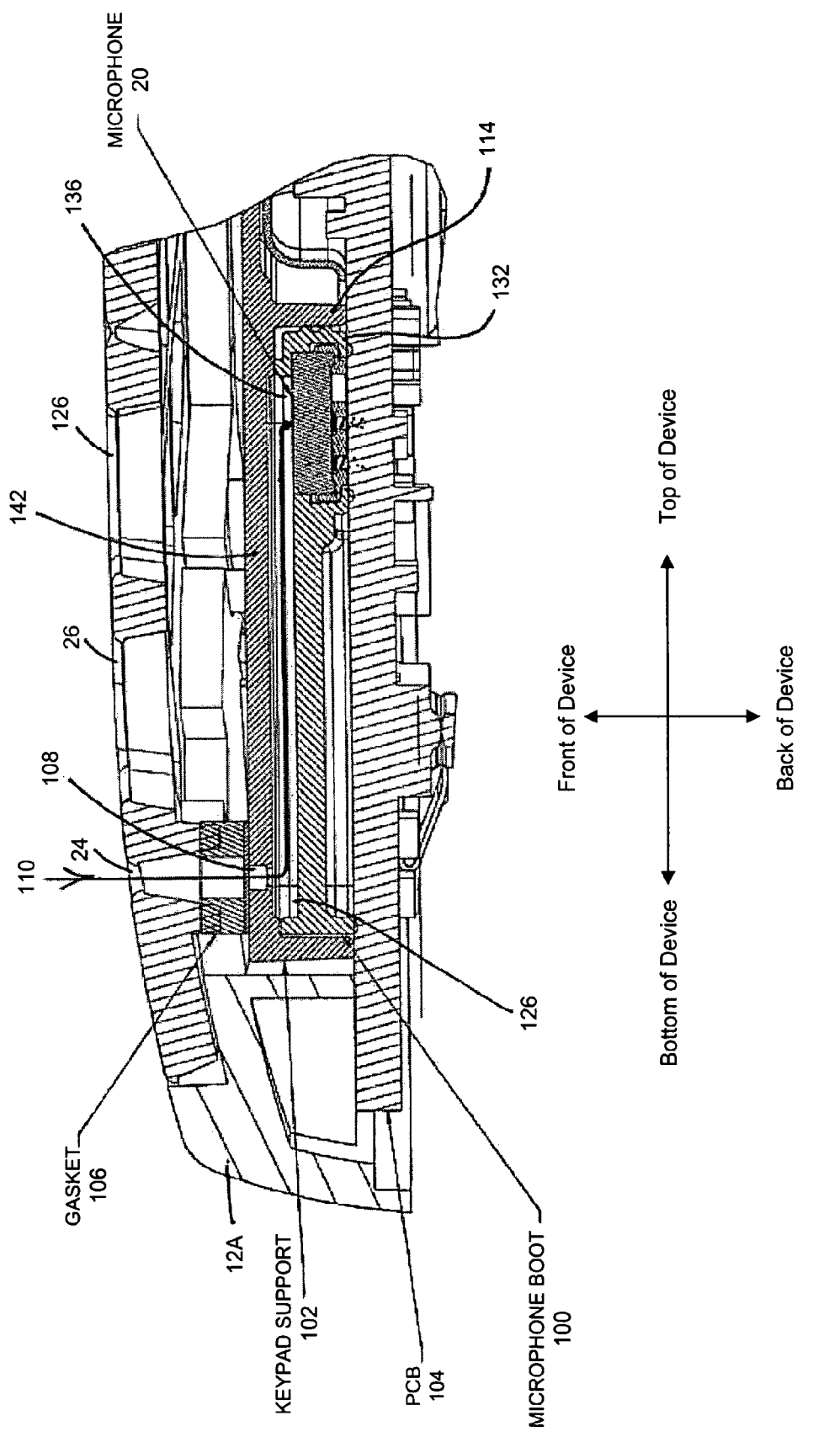
FIG. 5 is a side cross-section view of the bottom section of the components shown in FIG. 3.
Figure 6A:
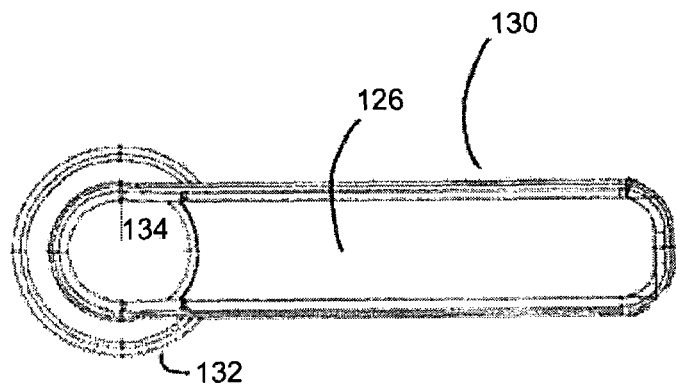
FIG. 6A is a top view of the microphone boot assembly of FIG. 3.
Figure 6B:
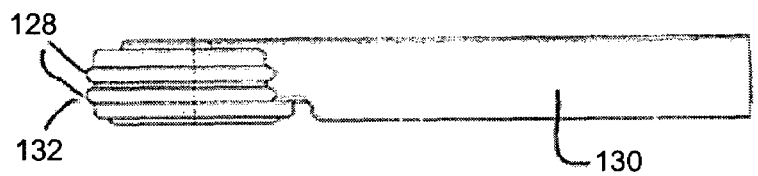
FIG. 6B is a side view of the microphone boot assembly of FIG. 3.
Figure 6C:
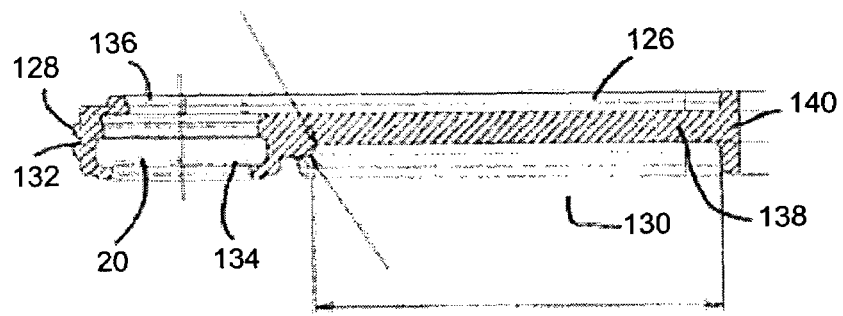
FIG. 6C is a side cross-section view of the microphone boot assembly of FIG. 3.
Figure 6D:
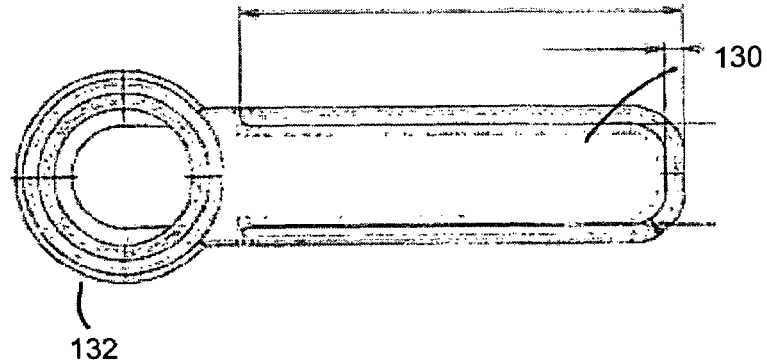
FIG. 6D is a bottom view of the microphone boot assembly of FIG. 3.
Figure 7B:
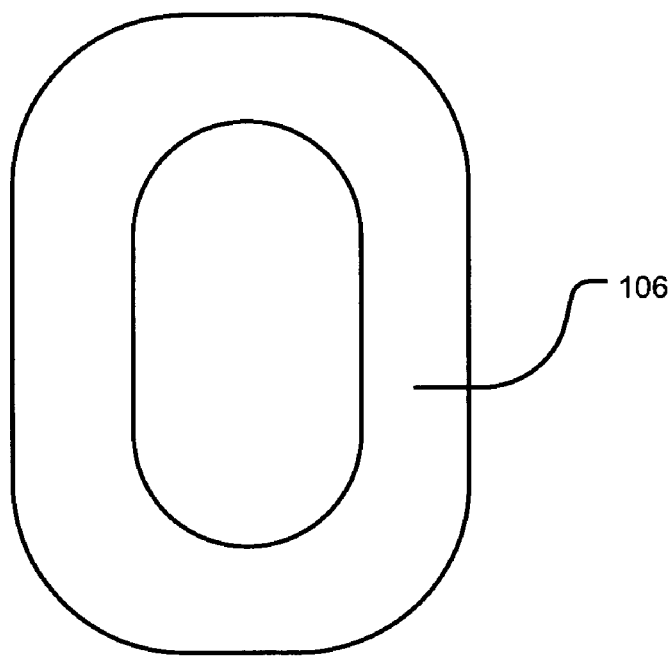
FIG. 7B is a top view of the gasket of FIG. 3.
Figure 7A:
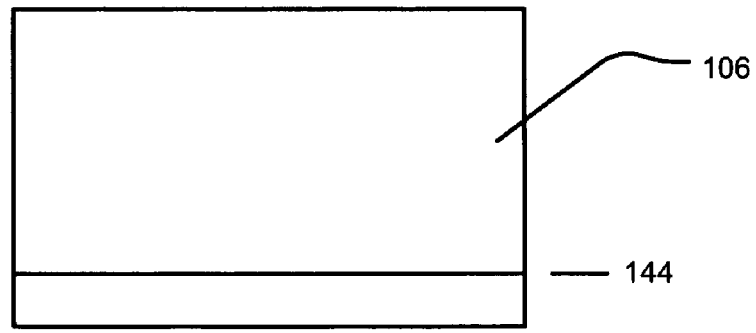
FIG. 7A is a side view of the gasket of FIG. 3.

FIGS. 3, 4A, 4B and 5 provide further detail on aspects of housing 12 and internal components of device 10. For the purposes of illustration, references to front side, back side, left side, right side, and top and bottom ends are provided using the orientation markings relative to the side view of device 10 as shown in FIG. 5. Therein, the front side of the PCB is the front facing side having display 16 mounted thereto. It will be appreciated that the term "top" may be used interchangeably the "front" side and the "top" end of device 10 and similarly that the term "bottom" may be used interchangeablely the "back" side and the "bottom" end of device 10. The relative positions will be clear in the context of the use of the terms. These references provide relative positional references for components for convenience only and are not meant to be limiting, unless otherwise noted.

PCB 104 provides a substrate for mounting and supporting the internal components on both of its top and bottom sides and provides some electrical circuitry for the devices, as defined by etchings within the layers of plastic and copper. As such, components can be more densely packed thereon, thereby reducing the size of PCB 104. PCB 104 is securely mountable within housing 12, typically via screws. PCB 104 is a generally planar sandwich of layers of plastic (or FR4) and copper. Microphone 20 is mounted to PCB 104 and makes electrical contact with terminals provided therein. Microphone 20 is shown as an upright-oriented cylinder casing having an aperture on its top allowing ambient sound signals to be received there through and to be converted into an electrical signal. Typically, there are at least two electrical contacts for microphone 20 which are generally located on its bottom side of its casing. Corresponding contact pads are located on PCB 104 to separately engage the contacts and complete an electrical circuit to which can be used by other elements within device 10. In other embodiments, microphone 20 may have an oblong-shaped case.

Certain physical and operational restrictions may affect the location of components on PCB 104 and to their placement on a particular side thereof. For example, a conventional industrial exterior design of device 10 has keypads on its top surface, thereby requiring that the electrical components relating to the keypad 14A be placed on the top side of PCB 104. Similarly, microphone 20 can be sensitive to interference signals from antennae 50 and/or 52. As such, it is preferable to locate microphone 20 as far away as possible from antennae 50 and 52. In one design layout, at least one of antennae 50 and 52 is located on the bottom of PCB 104 in the bottom part of device 10. To assist in isolating microphone 20 from interference from such antennae 50 and/or antenna 52, microphone 20 is located as far away as possible from such antennae.

Further detail on interior and exterior components of device 10 are now provided. In a bottom section of device 10, keypad 14A and microphone 20 are located. In order to have the keys of keypad 14A protruding through the front surface of housing 12A through opening 26, keypad support platform 102 is provided as a frame on which keypad 14A is mounted. Platform 102 is mated to PCB 104, thereby raising keypad 14A up to and through opening 26. Platform 102 is an oblong-shaped component having a flat base 142 mounted on an exterior frame 114. Base 142 is shaped to fit over the bottom portion of PCB 104. Frame 114 is a shaped wall which winds generally around the perimeter of base 142. An internal cavity 112 is formed within frame 114 and under base 142.

Keypad 14A can be mounted on keypad support platform 102 via a friction fit arrangement, screws, tabs and slot arrangements, double sided tape, welds, solder or other means. Keypad support platform 102 can be attached to PCB 104 using similar means. In particular, side latches 120 extending downward from platform 102 provide a snap-fit engagement with the sides of PCB 104 to hold platform 102 on top of PCB 104. Screw holes 122 allow screws to be inserted there through to further secure platform 102 to PCB 104.

When platform 102 is mounted onto PCB 104, cavity 112 is formed between PCB 104 and base 142. Different sized cavities can be provided by providing different shapes and sizes for platform 102. Cavity 112 allows components to be placed underneath platform 102 on PCB 104.

Taking advantage of the additional space for components provided by cavity 112, device 10 locates microphone 20 therein. Preferably the location of microphone 20 is set such that it is physically far enough away from other components which may interfere with the operation of microphone 20. It is also located such that its aperture faces upward, in a common orientation for voice communication devices. In particular, preferably microphone 20 is sufficiently far from antennae 50 and 52. More preferably, the location of microphone 20 is sufficiently far from other potentially interfering components so as to reduce or eliminate the need to provide radio frequency (RF) shielding through a separate shield for microphone 20. In some situation, however, it may still be beneficial to provide separate RF shielding for microphone 20.

With microphone 20 being located within cavity 112, it is also isolated from opening 24 in housing 12A. In order to channel audible signals received at opening 24 to microphone 20, the embodiment provides an acoustic channel to acoustically connect opening 24 to microphone 20. The acoustic channel generally follows a path as shown by arrow 110. Briefly, a series of components having conduits are linked together to define the acoustic channel. Each component is described in turn.

From opening 24, the acoustic channel comprises gasket 106, aperture 108 in platform 102 and boot assembly 100. Gasket 106 is a pliable upright tube which has its top opening mated to opening 24 and its bottom opening mated to aperture 108. Gasket 106 may be made from urethane foam. The bottom end of gasket 106 is preferably fixed to keypad support platform 102 with double-sided tape. Aperture 108 provides a vertical hole in platform 102. Opening 24, gasket 106 and aperture 108 are preferably aligned in a vertical column. However, different shapes and arrangements can be provided such that opening 24 and aperture 108 are not aligned directly to each other and that gasket 106 is shaped to still mate with both elements and provide part of the acoustic channel there between. When housings 12A and 12B are mated together, gasket 106 may compress between opening 24 and platform 102.

In the embodiment, aperture 108 is located at a bottom portion of platform 102. Microphone 20 is located in underneath a middle portion of platform 102. As such, to complete the acoustic channel, microphone boot assembly 100 provides a channel between the bottom side of keypad support platform 102 about aperture 108 to microphone 20. The boot assembly 100 carries the acoustic signal from the lower opening of aperture 108 in the bottom portion of platform 102 to the middle portion of platform 102.

Microphone boot assembly 100 is a generally columnar-shaped device which lies laterally on PCB 104 underneath platform 102. At one end, microphone boot assembly 100 encapsulates microphone 20 such that its aperture is exposed to an internal channel 126 running along its length. An end of channel 126 also connects to aperture 108, when boot assembly 100 is properly installed. The interior channel 126 is formed by the walls of boot assembly 100 and the bottom surface of platform 102. Boot assembly 100 provides a housing, as a microphone coupler, for microphone 20 as well as a portion of the acoustic channel.

Referring to FIG. 4A, microphone boot assembly 100 is held within platform 102 via a shaped portion of frame 114, noted as 114A, which preferably is shaped to provide a close friction fit for the exterior form of microphone boot assembly 100, allowing boot assembly 100 to be held within the shaped portion of frame 114 to reduce or eliminate the need for the use of adhesives or other binding technologies.

Referring to FIGS. 6A-6D, further detail on boot assembly 100 is shown. Generally boot assembly 100 comprises an elongated lateral section 130 and a microphone coupling section 132 located at one end of section 130. Coupling section 132 is an upright cylindrical section open at both ends having interior volume 134 preferably shaped to fit snugly around the exterior sides of microphone 20 allowing a positive and secure insertion of microphone 20 in volume 134. Further the shape of interior volume 134 allows the contacts on the bottom of microphone 20 to be exposed to and make connection with corresponding contact pads on PCB 104 for the microphone. Coupling section 132 is shaped to have a height such that the interior volume 134 has a gap 136 above microphone 20 to allow audible signals to be carried from lateral section 130 to volume 134 and to the aperture of microphone 20. It will be appreciated that microphone 20 may be inserted into volume 134 and may be snugly held therein, allowing microphone body 100 and microphone to be inserted as one combined component during the assembly process of device 10.

Elongated section 130 is generally comprised of a horizontally extending beam 138 projecting outward from coupling section 132, below gap 136. On the top surface of beam 138 is wall 140 which runs along the exterior perimeter of section 132. The height of wall 140 extends from the bottom of coupling section 132 to the top of coupling section 132. As such, interior channel 126 is formed above beam 138. When microphone 20, boot assembly 100 and support 102 are assembled and mounted on PCB 104, at the anterior end of beam 138, channel 126 is in communication with aperture 108 on keypad support platform 102 and at the other end of beam 138, channel 126 is in communication with gap 136, thereby forming a channel for the last section of the acoustic channel. To complete the last section of the acoustic channel, when boot assembly 100 is inserted into frame section 114A, the top surface of boot assembly 100 is pressed flush against the bottom surface of platform 102. As such, the bottom surface of platform 102 forms a cover for channel 126. As walls 114A are shaped to enclose boot assembly 100 against platform 102, the walls 114A assist in sealing the interface between boot assembly 100 and platform 102. To assist in retaining boot assembly 100 within section 114A, outwardly extending features may be provided on the lateral exterior surfaces of boot assembly 100 which provide points of friction between assembly 100 and sections 114A. For example, lateral ridges 128 may be provided on the exterior of section 132.

Boot assembly 100 is made of a rubber-like, flexible material and is pliable allowing it to snugly fit around microphone 20. In other embodiments, selected surfaces of boot assembly 100 may be metallized to provide RF shielding for microphone 20. If surfaces were metallized, it would be preferable that such surfaces do not significantly compromise the performance of other components, such as antennae 50 and/or 52.

It will be appreciated that the acoustic channel may have some effect on the acoustic frequency response of the audible signals as they wind through the channel from the opening 24 to microphone 20. Generally, the channel provides a relatively straight vertical section descending from opening 24 then a 90 degree turn through interior volume 126 and another 90 degree turn to the aperture of microphone 20. In most instances, the two 90 degree turns do not have a significant impact on the acoustics. It will be appreciated that the overall length of the acoustic channel, including the two 90 degree turns, may create undesirable resonances in the frequency range of interest. Signal shaping may be provided to address such resonances. If signal shaping is required, an acoustic mesh can be inserted in the acoustic channel to act as a damper for targeted (generally high) frequencies in the signals. The mesh can be of any material known in the art and can be inserted in any appropriate location in the acoustic channel. However, a more effective location for the mesh is to have it placed as close as possible to opening 24. In one embodiment, a layer of acoustic mesh 144 can be placed between gasket 106 and platform 102. A layer of double-sided tape can be used to attach mesh 144 to the bottom of gasket 106 and another layer of double-sided tape can be used to secure the bottom side of the mesh to platform 102. In other embodiment, signal shaping through DSP processing of the electronic signals produced by microphone 20 may be provided to address any signal shaping requirements. For example, the DSP processing may attempt to fit the signals within certain operating masks for certain communication standards, such as the known GSM mask.

In one embodiment, the length of volume 126 to the center of volume 134 is approximately 15 mm; the height is approximately 0.5 mm; and the width is approximately 2.7 mm. Other dimensions for other applications may be used.

In other embodiments, a fully enclosed shaped tube may be used to connect the bottom opening of aperture 108 to microphone 20.

In other embodiments, the acoustic channel may be routed downward from opening 24 and pass beside platform 102. Therein, boot assembly 100 may extend from underneath platform 102 and have an elbow conduit rising upwards to meet opening 24. In such an embodiment, gasket 106 may not be required. However, an acoustic mesh may still be used.

Although the invention has been described with reference to certain specific embodiments, various modifications thereof will be apparent to those skilled in the art without departing from the scope of the invention as outlined in the claims appended hereto.

We claim:

1. A communication device, comprising: a microphone; a printed circuit board (PCB) to connect to said microphone; a platform having an aperture; a boot assembly to enclose said microphone and to direct acoustic signals to said microphone, said boot assembly having a coupling section shaped to hold said microphone with said aperture facing upward from said PCB and a lateral rib extending around its exterior to mate with an interior surface of said platform; a housing to enclose said PCB, said microphone, said platform and said boot assembly, said housing providing an opening to access said microphone; and an acoustic channel to connect said microphone to said opening in said housing, wherein part of said acoustic channel is formed by a channel formed by said boot assembly and a bottom surface of said platform when said boot assembly is mounted over said microphone; said platform is mounted over said boot assembly; and said housing is assembled to enclose said PCB.

2. The communication device as claimed in claim 1, wherein: said part of said acoustic channel connects to a bottom side of said aperture; and said acoustic channel also comprises a gasket having an internal conduit, said gasket mounted at one end to a top side of said aperture and at another end to said opening.

3. The communication device as claimed in claim 1, wherein said platform further comprises a frame shaped to hold said assembly underneath said platform.

4. The communication device as claimed in claim 3, wherein said lateral rib mates with said frame of the platform.

5. The communication device as claimed in claim 1, wherein said opening in said housing is located in a lower end of said housing.

6. The communication device as claimed in claim 1, wherein said microphone is mounted on said PCB with an aperture of said microphone facing upward from said PCB.

7. The communication device as claimed in claim 6, further comprising a gasket having an internal conduit, said gasket mounted at one end to a top side of said aperture and at another end to said opening.

8. The communication device as claimed in claim 6, wherein: said boot assembly further comprises a beam extending outwardly from said coupling section; and a wall extending above a perimeter of said beam, forming said channel within said wall and above said beam and with an air gap above said aperture of said microphone.

9. The communication device as claimed in claim 8, wherein said channel forms a first 90 degree turn from said microphone and a second 90 degree turn to said aperture in said platform.

10. The communication device as claimed in claim 8, wherein an acoustic mesh is provided in said acoustic channel.

11. The communication device as claimed in claim 8, wherein digital signal processing is provided to adjust signals generated by said microphone to accommodate for acoustic characteristics of said acoustic channel.

12. The communication device as claimed in claim 8, wherein a keypad is mounted on a top surface of said platform.

13. A microphone coupler for a microphone in a communication device, comprising: a coupling section shaped to hold said microphone with said aperture facing upward from said PCB; said coupling section having a lateral rib extending around its exterior to mate with an interior surface of a platform in said communication device; a beam extending outwardly from said coupling section; and a wall extending above a perimeter of said beam, forming a channel within said wall and above said beam and with an air gap above said aperture of said microphone and said volume.

14. The microphone coupler as claimed in claim 13, wherein said conduit forms a first 90 a degree turn from said microphone and a second 90 degree turn to said aperture.

15. The microphone coupler as claimed in claim 14, wherein said coupler is shaped to mate with a platform to hold said coupler underneath said platform and to seal against a bottom side of said platform to seal said channel.

16. A communication device, comprising: an antenna; a microphone located at said first location to isolate said microphone from said antenna; a printed circuit board (PCB) to connect to said microphone; a platform having an aperture; a boot assembly to enclose said microphone and to direct acoustic signals to said microphone, said boot assembly having a coupling section shaped to hold said microphone with said aperture facing upward from said PCB and a lateral rib extending around its exterior to mate with an interior surface of said platform; a housing to enclose said PCB, said microphone, said platform, said antenna and said boot assembly, said housing providing an opening to access said microphone, said opening being closer to said antenna than said microphone; and an acoustic channel to connect said microphone to said opening in said housing, wherein part of said acoustic channel is formed by said boot assembly and a bottom surface of said platform when: said boot assembly is mounted over said microphone; said platform is mounted over said boot assembly; and said housing is assembled to enclose said PCB.

17. The communication device as claimed in claim 16, wherein said antenna is located in a lower end of said housing.

18. The communication device as claimed in claim 16, wherein said boot assembly further comprises: a beam extending outwardly from said coupling section; and a wall extending above a perimeter of said beam, forming said channel within said wall and above said beam and an air gap above said aperature of said microphone.

* * * * *